United States Patent [19]
Ruf et al.

[11] Patent Number: 5,465,611
[45] Date of Patent: Nov. 14, 1995

[54] SENSOR HEAD FOR USE IN ATOMIC FORCE MICROSCOPY AND METHOD FOR ITS PRODUCTION

[75] Inventors: Alexander Ruf; Michael Abraham; Manfred Lacher, all of Mainz; Thomas Zetterer, Schwabenheim; Thomas R. Dietrich, Frankfurt, all of Germany

[73] Assignee: IMM Institut Fur Mikrotechnik GmbH, Germany

[21] Appl. No.: 220,157

[22] Filed: Mar. 30, 1994

[30] Foreign Application Priority Data

Mar. 30, 1993 [DE] Germany ............... 43 10 349.9

[51] Int. Cl.⁶ ................................................. G01B 9/00
[52] U.S. Cl. ................................................. 73/104; 73/105
[58] Field of Search ..................... 73/788, 105, 104; 250/306, 307, 310, 311; 156/625; 356/345

[56] References Cited

U.S. PATENT DOCUMENTS

| | | | |
|---|---|---|---|
| 5,017,010 | 5/1991 | Mamin et al. | 356/345 |
| 5,025,658 | 6/1991 | Elings et al. | 73/105 |
| 5,079,958 | 1/1992 | Takase et al. | 73/862.64 |
| 5,119,024 | 6/1992 | Popovic et al. | 324/244.1 |
| 5,193,385 | 3/1993 | Nishioka et al. | 73/105 |
| 5,231,286 | 7/1993 | Kajimura et al. | 250/234 |
| 5,245,863 | 9/1993 | Kajimura et al. | 73/105 |
| 5,247,186 | 9/1993 | Toda | 250/561 |
| 5,260,926 | 11/1993 | Kuroda et al. | 369/100 |
| 5,294,804 | 3/1994 | Kajimura | 250/561 |
| 5,304,795 | 4/1994 | Fujihira et al. | 250/234 |
| 5,322,798 | 7/1994 | Sadowski | 436/113 |

FOREIGN PATENT DOCUMENTS

| | | |
|---|---|---|
| 0290648 | 11/1988 | European Pat. Off. . |
| 0440268 | 8/1991 | European Pat. Off. . |
| 0509716 | 10/1992 | European Pat. Off. . |
| 4107605 | 4/1992 | Germany . |
| 63-304103 | 12/1988 | Japan ............... 73/105 |
| 8907258 | 8/1989 | WIPO . |
| 9015986 | 12/1990 | WIPO . |

OTHER PUBLICATIONS

IBM Technical Disclosure Bulletin, vol. 32, No. 2, Jul. 1989.
J.Va. Sci. Technol. A 8 (4), Jul./Aug. 1990, pp. 3386–3396.
Appl. Phys. A, Bd. 55, 1992, pp. 476–477.
IBM Technical Disclosure Bulletin, vol. 32, No. 3A, Aug. 1989.
Journal of Applied Physics, vol. 72, No. 11, Dec. 1992.

*Primary Examiner*—Richard Chilcot
*Assistant Examiner*—Max H. Noori
*Attorney, Agent, or Firm*—Mary R. Bonzagni; Holland & Associates

[57] ABSTRACT

A sensor head (1) is described, which has a spacer (5b) between a carrier element (2) and the spring arm (7), which, perhaps carries a sensor tip (9) at the free end; the spacer defines the distance d between the spring arm (7) and the carrier element (2). In a preferred embodiment, the spacer (5b) comprises a sacrificial layer (5a), which is etched out, except for the spacer (5b), after the formation of a corresponding layer system between the spring arm (7) and the carrier element (2). The carrier element (2) and the spring arm (7) are each provided with a reflecting layer (4 and 6). In accordance with another specific embodiment, plasmonactive layers can also be provided.

20 Claims, 4 Drawing Sheets

SENSOR HEAD FOR USE IN ATOMIC FORCE MICROSCOPY AND METHOD FOR ITS PRODUCTION

BACKGROUND OF THE INVENTION

The invention concerns a sensor head for use in atomic force microscopy. The invention refers also to a method for the production of such sensor heads and to a method for the measurement of the deflection of the spring arm.

Such sensors heads are used in, among other things, atomic force microscopy (AFM), which is a very sensitive type of surface profilometry. The central component of a force microscope is the sensor head, which consists of a carrier element, a spring arm, and a sensor tip, which is swept over the specimen surface. The deflection of the spring arm caused thereby is detected with a suitable measuring method.

Force microscopy is used in two types of operations. In a measurement with atomic sensitivity, the tip is in contact with the surface of the specimen. The repulsive forces between the specimen and the first atom in the tip are thereby utilized. The contact forces of the spring arm lie in the range of $10^{-7}$ to $10^{-10}$ N. Spring constants of the spring arm of 0.01 to 10 N/m result therefrom.

Often even these slight forces are still too large and therefore result in deformations of the specimen surface. In these cases, for example, the attracting Van der Waals forces between the specimen and the tip are utilized. The tip is, moreover, in the interaction range of these forces, but is not in contact with the specimen surface. For the measurement, the spring arm is excited to resonant vibrations. With a change in the force gradient between the specimen and the tip, the effective spring constant of the system and thus also the resonant frequency change. Either this frequency shift is measured or, at a constant frequency, the change in the vibration amplitude of the spring arm caused thereby is detected with the aid of the lock-in technique. With this measurement method, an atomic resolution is not attainable. The resolution is, moreover, very greatly determined by the tip configuration, since many atoms of the tip contribute to the interaction.

In each of the two types of operations, measurements can be taken at a constant height or at a constant force or constant force gradient. In the first case, the distance between the spring arm and the specimen is maintained constant, and the deflection of the spring arm is recorded. In the second case, the force or the force gradient between the spring arm and the specimen is maintained constant by a servo loop. For this, the specimen is located, for example, on a piezoelectric adjusting element, with which the distance between the tip and the specimen can be adjusted.

Several methods are known for the detection of the deflection of the spring arm. The most accessible are optical detection methods, such as the light pointer principle and the interferometric principle.

From U.S. Pat. No. 5,017,010, the model of an interferometric force microscope is known. The spring arm is positioned up to a few microns before the end of a glass fiber, so that the light can exit from the fiber and can again be coupled into the fiber by the reflection at the spring arm. This light interferes with the light backreflected at the glass fiber end in the fiber, wherein the sinusoidal interference signal is used for the detection of the deflection of the spring arm. A high sensitivity is attained at the steepest points of the interference signal. The arrangement has the disadvantage, however, that this optimal working point must be adjusted mechanically. A piezoelectric adjusting element is used for this: it adjusts the distance between the end of the fiber and the microscope arm to the sensitive point of the interference signal. This system is therefore very expensive with respect to positioning. In addition, phase jitters of the light in the glass fiber has a drastic effect on the interference signal. For stability reasons, the glass fiber end is glued on and cannot be renewed without great adjustment expenditure. Since the system consists of different components, it has a very large thermal drift. The piezoelectric adjustment element is, moreover, an additional source of noise.

From European Patent 0,440,268 A2 and European Patent 0,290,648, the structure of a compact interferometric force microscope sensor is known, which has a spring arm attached via a hole. A partially transparent mirror is fastened to the lower side of the hole. The light arrives on the metal-deposited microscope arm by means of the partially transparent mirror and is reflected there. The reflected light interferes with the light reflected at the partially transparent mirror.

If the detection system is to attain the high resolution needed for force microscopy, the work must also be carried out at the steepest point of the interference signal. The disadvantage is that this point of the interference signal must be adjusted. This should be done through the electrostatic repulsion of the spring arm by utilizing the metal coating found on the spring arm and the carrier element as electrodes.

Another disadvantage is that the mirror must be positioned over the hole, which represents an additional manual adjustment expenditure. Moreover, the long optical path length in the sensor is disadvantageous since it requires a great coherence length of the light, so that the usable light sources are limited to lasers.

The most compact optical force microscope sensor until now consists of a laser diode feedback system, such as described in U.S. Pat. No. 5,025,658. A laser diode output signal is thereby formed with the spring arm by a Fabry-Perot interferometer, whose interference signal arrives back at a photodetector by means of the laser diode. In this system also, the most sensitive point of the interference signal is adjusted with a piezoelectric adjusting element. An atomic resolution was thus not attained, since the spring arm cannot work at the contact between the tip and specimen.

A force microscope is known from IBM Technical Disclosure Bulletin, Vol. 32, 1989, pages 416–417, in which the spring arm and distance spacer are made from one piece. This component is attached to a glass block, which is provided with a metal layer, as is the force arm, in order to be able to exert an electrostatic force on the force arm. It is not possible to set the desired distance to the carrier element without adjustment because of the manufacturing tolerances of such a one-piece component. In addition, there is also the fact that the one-piece component must be fastened to the glass block—for example, by means of an adhesive—which also leads to an undefined distance of the spring arm to the surface of the glass block.

The same is also true for West German Patent 4,107,605 C1, according to which even the sensing arm and the optoelectronic device form one common part and are made from one common plate. The entire arrangement is produced by etching. A readjustment is necessary also with this spring arm.

J. Vac. Sci. Technol. A, Vol. 8, 1990, pages 3386–95, describes two spring arms which are placed on a silicon element. The spring arm is exposed by etching. However, there is no carrier element which extends over the area of the sensor tip in the described arrangements.

SUMMARY OF THE INVENTION

The goal of the invention is therefore a sensor head, in which an adjustment of the working point after its incorporation is omitted; the sensor head can be easily replaced, and its thermal drift is reduced to a minimum. The method for the production of such sensor heads should be suitable for mass production, and the method for the measurement of the deflection of the spring arm of such a sensor head should be distinguished by a simple structure and great accuracy.

The goal of the invention is attained by a sensor head in accordance with Claim 1. The method is the object of Claims 11 and 13, and the method for the measurement of the deflection of a spring arm of a sensor head in accordance with the invention is the object of Claim 20.

DETAILED DESCRIPTION OF THE PREFERRED EMBODIMENTS

Figure 1:
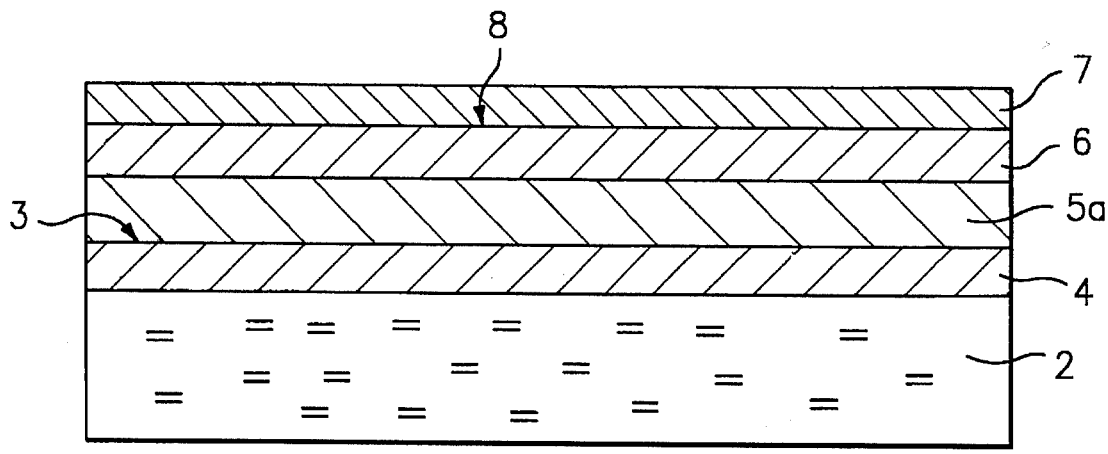
FIG. 1, a layer system for a sensor head.

The sensor head in accordance with the invention is especially used in force microscopy. In this case, the spring arm has a sensor element—for example, a sensor tip—on its free end. The use of the sensor head, however, is not limited to force microscopy, but it can be used, for example, as an acceleration sensor.

The spring arm, just like the carrier element, is an independent component of the sensor head and is connected to the carrier element via a spacer from a layer of defined thickness. The adjustment of the distance of the spring arm to the carrier element thus takes place in the production of the sensor head by a determination of the thickness of the layer serving as a spacer. Thus, after the incorporation of the sensor head—for example, into a force microscope—a mechanical adjustment of the optimal working point for the interference signal is no longer required. Since the thickness of the layer and thus the distance can be adjusted with great accuracy, other adjustment devices, such as piezoelectric elements, are omitted.

The spring arm is designed in such a way that the thickness of the layer is equal to the distance of the spring arm between its free end and the carrier element. The thickness of the layer and thus the distance of the spring arm can be reduced to an extent just before the spring arm can be drawn toward the carrier by the attractive Van der Waals forces. The fixed adjustment of the distance of the spring arm to the carrier element down to a few hundred nanometers could not yet be attained but opens up new possibilities with regard to the method for measuring the deflection of the spring arm; thus, for example, the excitation of surface plasmons in plasmon-active layers, which will be described below.

Another advantage of the sensor head is to be found in the fact that it can be entirely replaced in a simple manner without an adjustment being necessary during the insertion of a new sensor heat. It has also turned out that the thermal drift of the sensor head is clearly smaller than that of known sensor heads.

The layer of defined thickness serving as a spacer is preferably a sacrificial layer, which is advantageously made of nickel, titanium or titanium oxide. Sacrificial layers have the advantage that the production of the sensor head is possible in a simple manner, since for the creation of the necessary free space between the spring arm and the carrier element, the sacrificial layer can be etched out, wherein the spring arm can be connected to the carrier element at one or both ends.

Preferably, the areas of the carrier element and the spring arm, opposite one another, carry a reflecting layer, wherein the carrier element is made of transparent material, for example, glass. So that, in this specific embodiment, the spacer between the spring arm and the carrier element is defined by the spacer(s), the reflecting layers are also present between the spring arm and the spacer or the spacer and the carrier element.

In order to facilitate an interferometric evaluation of the deflection of the spring arm, the reflecting layer on the carrier element is partially transparent. Depending on the formation of the reflecting layers, the spring arm-carrier element system can be operated as a Fabry-Perot interferometer, wherein the electromagnetic radiation from the back side of the preferably transparent carrier element is directed onto the sensor head. Since the two reflecting areas are closer to one another than is the case with known sensor heads, the coherence length of the electromagnetic radiation can be shorter so that one is not limited to using laser light.

The thickness of the sacrificial layer and thus the distance between the two reflecting layers is preferably an uneven multiple of $\lambda/4$ wherein $\lambda$ stands for the wavelength of the electromagnetic radiation directed onto the sensor head. By means of the adjustment of a multiple of $\lambda/4$, the working point of the interferometer lies in the most sensitive point of the performance curve.

The adjustment of the distances between the spring arm and the carrier element in the nanometer range opens up the possibility of utilizing the excitation of surface plasmons for the determination of the deflection of the spring arm. For this purpose, the reflecting layers are replaced by plasmon-active layers. Here it is sufficient if merely one plasmon-active layer is provided either on the spring arm or the carrier element. The providing of two plasmon-active layers on the opposite sides of the spring arm and the carrier element facilitates another increase in the measurement accuracy with respect to the deflection of the spring arm. A distance of approximately 500 to 800 nm must be maintained so that surface plasmons can be excited in these plasmon-active layers; this is possible due to the providing of a correspondingly thin layer as spacer in this area. The exact distance depends on the wavelength used and the optical characteristics of the plasmon-active layers and the other materials of the layer system.

To excite surface plasmons, it is necessary to direct parallel polarized monochromatic light at an angle greater than the total reflection angle onto the carrier element, so that an evanescent field, which excites the surface plasmons in the plasmon-active layers, is formed at the interface of the carrier element, which is turned toward the spring arm. In order to facilitate the irradiation in the range of the total reflection angle, a prism is placed on the back side of the carrier element, or the carrier element itself is designed as a prism, wherein a lateral face of the prism is turned toward the spring arm.

The exact working point is adjusted to the maximum slope of the measurement signal via the angle of incidence.

In accordance with another specific embodiment, it is also possible for the carrier element to carry a diffraction grating on its upper or lower side, which can be produced photolithographically. Here too, the grating constant must be selected in such a manner that the coupling condition for the excitation of surface plasmons is fulfilled for the given wavelength and the optical constants of the layer system of the sensor head.

The detection of the excursion of the spring arm takes place here by the measurement of the intensity of the reflected light. The plasmon excitation becomes apparent through a sharp resonance—like minimum of the reflected intensity. A change in the air gap—that is, the distance between the spring arm and the carrier element—produced by the reflection of the spring arm, therefore, has a drastic effect on the excitation condition of the plasmon and changes the reflected intensity.

Layers of gold, aluminum, or silver are preferably used as plasmon-active layers.

The production method of the sensor head is based on the formation of a layer system, wherein one layer is a sacrificial layer.

In accordance with an initial specific embodiment, the layer system is applied to the back side of the spring arm and subsequently the carrier element is connected with the layer system. Afterwards, the sacrificial layer is removed down to at least one spacer at the end of the spring arm by means of etching.

For the production of the sensor head, the spring arm—perhaps with an integrated sensor tip—can first be produced according to a known method, as is described, for example, in J. Vac. Sci. Technol. AB(4) 1990, 3386. A hole approximately 2 to 3 µm in depth is produced in a <100> silicon wafer by means of anisotropic etching. Then, for example, a silicon oxinitride layer with a thickness of approximately 600 nm is applied to the silicon wafer by reactive sputtering. This layer fills up the hole and at the same time forms the spring arm.

Based on this system, the production of the rest of the sensor head then takes place, wherein the silicon wafer is not removed until the etching of the sacrificial layer. With the aid of a mask, the shape of the spring arm—perhaps with the integrated tip—is hereby etched from the silicon oxinitride layer.

Other materials for the spring arm may be silicon nitride or silicon carbide.

According to another specific embodiment, the layer system is applied on the carrier element, wherein one layer is also a sacrificial layer. Subsequently, a layer, such as silicon nitride, SiC or $SiO_2$, is applied to the layer system.

The sacrificial layer is also removed, except for at least one spacer at one or both ends of the spring arm by means of etching.

The application of a sensor tip on the spring arm before the removal of the sacrificial layer can take place, for example, according to the method described in J. Vac. Sci. Technol. AB(4) 1990, 3386. A two-layer system is produced, wherein the upper layer is made of a titanium-tungsten compound, which has a hole (typically with a diameter of 3 µm) at the place provided for the tip. Through this hole, the lower layer made of, for example, copper is etched down to the silicon-containing layer. Subsequently, a metal layer is vapor-deposited, so that a tip is formed by the hole mask of the upper layer on the silicon-containing layer. Then the two-layer system is removed. The spring arm is exposed by etching, wherein for protection, the tip can be covered with a photosensitive resist.

The applied layer system exhibits at least one reflecting and/or plasmon-active layer, in addition to the sacrificial layer, depending on which of the previously described sensor heads is to be produced. The layer system is preferably vapor-deposited or sputtered, wherein the reflecting layer or the plasmon-active layer is preferably applied via the lift-off technique.

In order to improve the adhesion of the reflecting layer or the plasmon-active layer, an adhesive layer made of chromium is preferably applied before the application of the pertinent layer.

The thickness of the sacrificial layer, which is responsible for the later spacing of the spring arm and the carrier element, is produced by monitoring during the application of the sacrificial layer. In this way, the thickness of the sacrificial layer can be precisely adjusted down to +5 nm during the application.

So that the stress on the individual layers is equalized, an identical coating is also applied on the lower side of the spring arm, utilizing the lift-off technique; the coating can be a reflecting layer or a plasmon-active layer—perhaps with an adhesive layer—depending on the type of sensor head.

Examples of specific embodiments are explained in more detail below with the aid of drawings.

Figure 2:
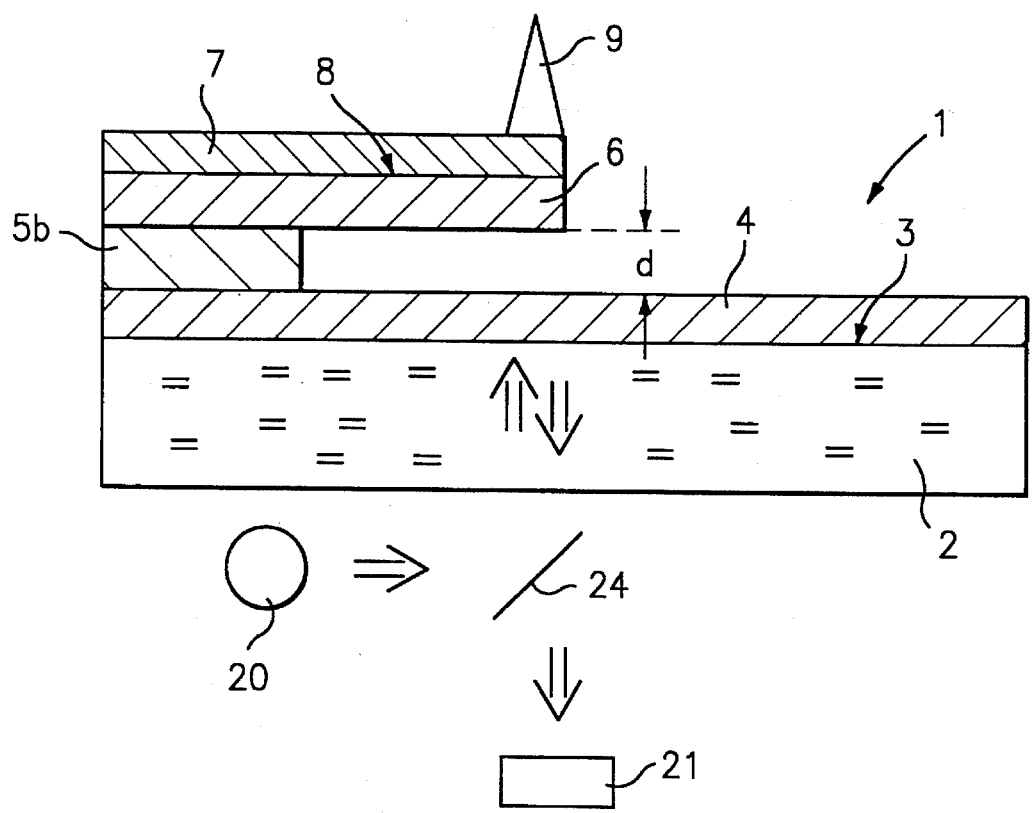
FIG. 2, a sensor head in lateral view.

FIG. 1 shows schematically a layer system which is suitable for the production of a sensor head 1. A reflecting layer 4, which is followed by a sacrificial layer 5a and another reflecting layer 6, is applied on the upper side 3 of a carrier element 2. Another layer, which forms the later spring arm 7, is formed on the upper side 8 of the reflecting layer 6. The sacrificial layer 5a is removed by etching between the reflecting layers 4 and 6 to such an extent that a spacer 5b remains, as is shown in FIG. 2. The thickness of the sacrificial layer 5a and thus the thickness of the spacer 5b define the space d between the spring arm 7 and the carrier element 2. Since the carrier element 2 and the spring arm 7 are each provided with a reflecting layer 4 and 6, which extend also over the spacer 5b, the distance from the spring arm to the carrier element is not influenced by these reflecting layers. A sensor tip 9 is applied at the free end of the spring arm 7, if the sensor head 1 is to be used in a force microscope.

Figure 3:
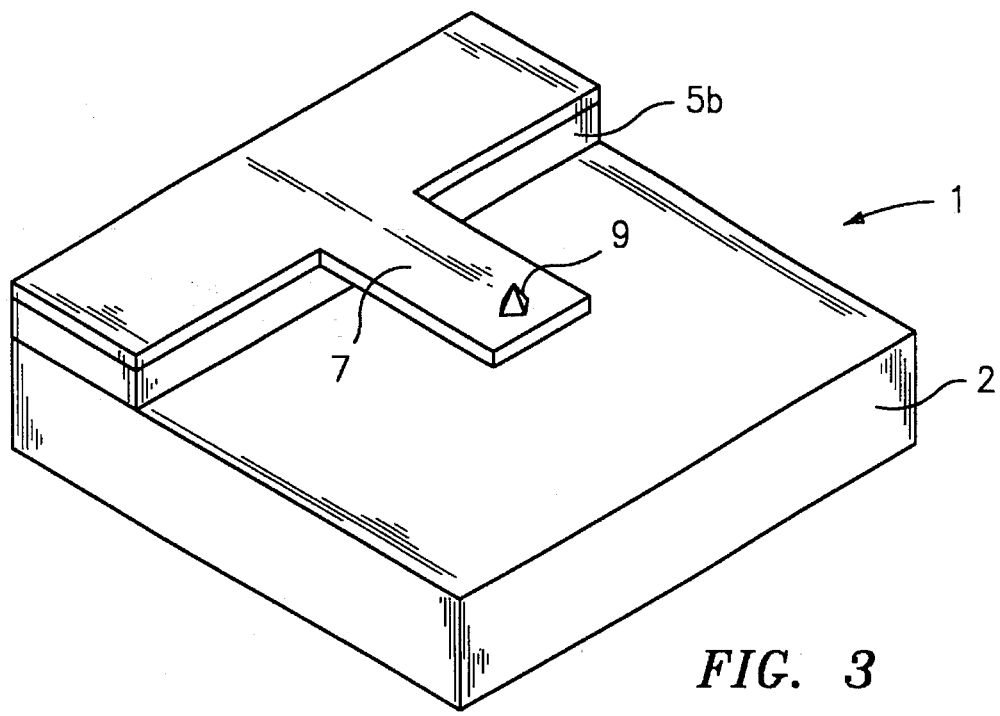
FIG. 3, the sensor head shown in FIG. 2 in perspective representation.

FIG. 3 shows the perspective representation of the sensor head 1 shown in FIG. 2. The spring arm 7 extends over the middle area of the carrier element 2.

The carrier element 2 is made of a transparent material, and the reflecting layer 4 is partially transparent, so that the sensor head 1 shown in FIG. 2 can be used as an interferometric sensor head. The light indicated by the arrows and directed from a light source 20 via a beam splitter 24 is reflected both at the reflecting layer 4 and at the reflecting layer 6, so that interference exists. The reflected light is measured by a detector 21.

Figure 4:
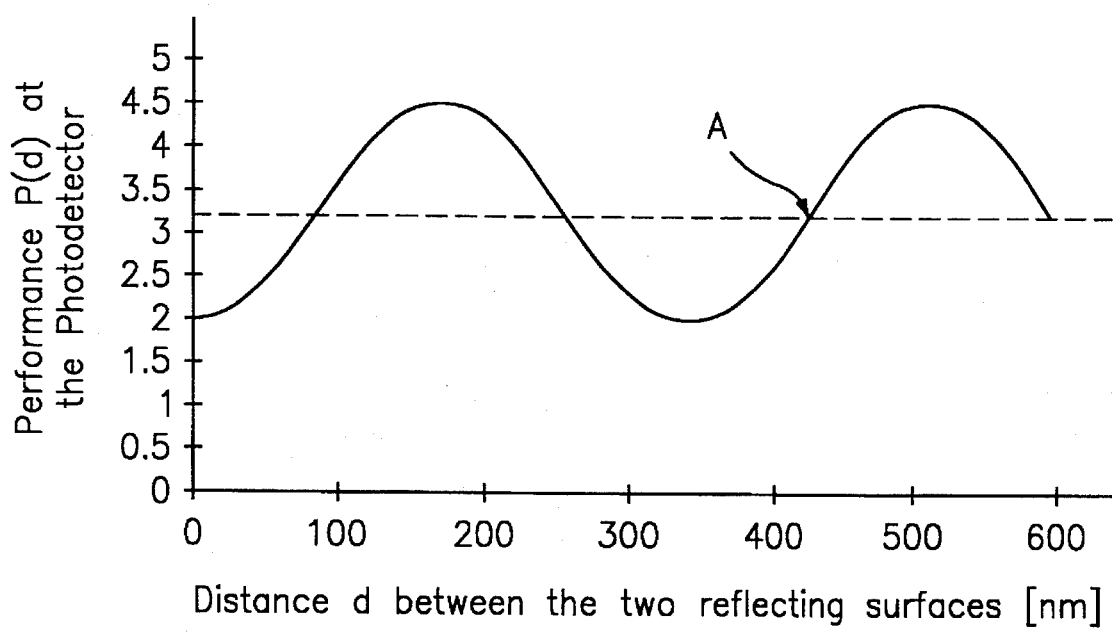
FIG. 4, a performance curve as a function of distance d between the reflecting layers of an interferometric sensor head.

The performance P(d) is shown in FIG. 4 as a function of the distance d between the two reflecting layers 4 and 6. The sinusoidal curve is described by the following formula:

$$P(d) = P_{background} + F \cdot P_o \cdot \sin^2(2\pi d/\lambda + \phi)$$

with $F = 4 \cdot R/(1-R)^2$ $R = r \cdot r'$ r=Reflectivity of the first mirror r'=Reflectivity of the second mirror P(d)=Performance at the photodetector 21

$P_{background}$=Background performance (noise, etc.)

d=Distance between the two mirrors

[λ]=wavelength

F=Fineness [sic] of the interferometer

φ=Phase shift, material-dependent

The thickness of the spacer 5b is advantageously adjusted in such a way that the working point A lies in the steepest point of the performance curve. The performance curve shown in FIG. 4 is valid for r=0.3, r'=1, and a wavelength λ=670 nm and a phase shift φ=0. The working point A can be precisely adjusted by the thickness of the sacrificial layer to ±5 nm.

Figure 5:
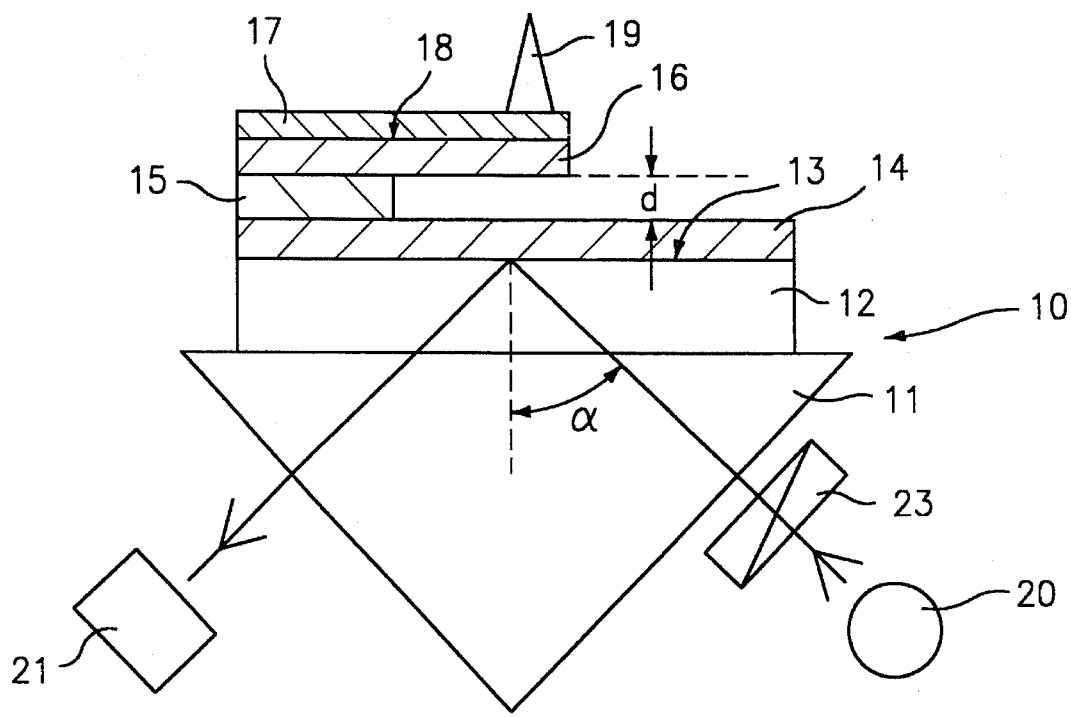
FIGS. 5, 6 and 7, sensor heads in different specific embodiments with plasmon-active layers.
Figure 8:
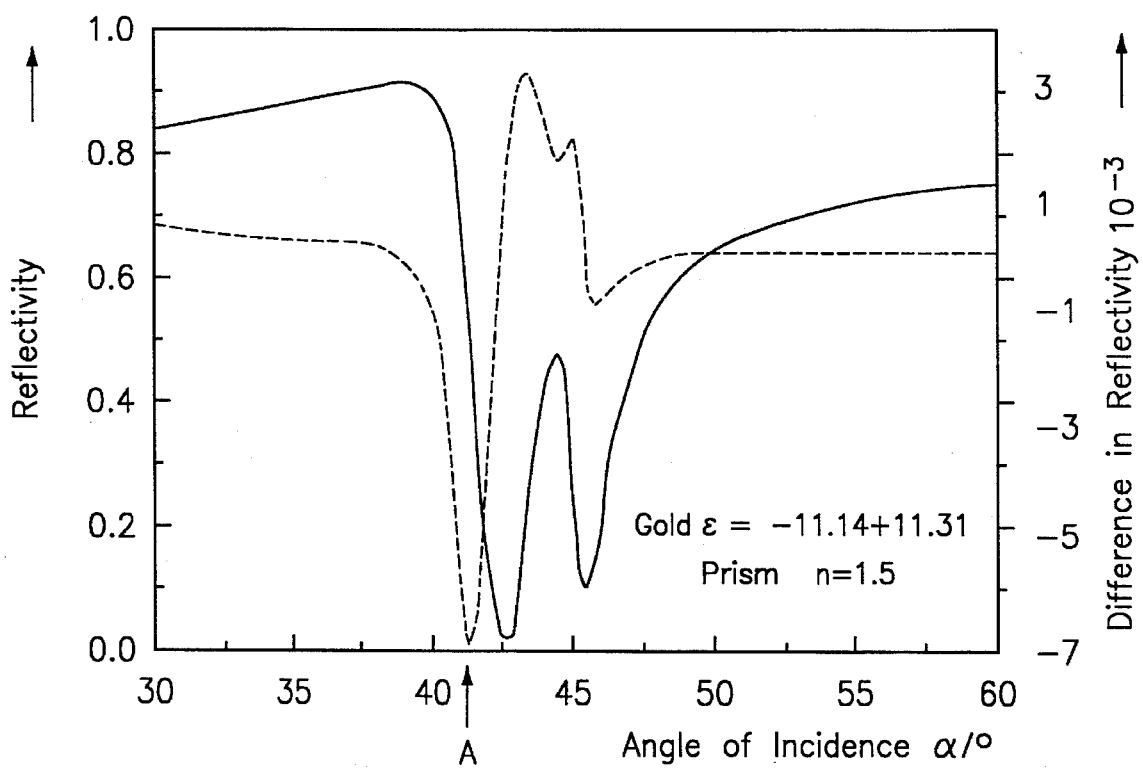
FIG. 8, the reflectivity as a function of the angle of incidence $\alpha$ with one of the sensor heads shown in FIGS. 5 to 7.

FIG. 5 shows a sensor head 10, which is suitable for the detection of the arm deflection via the excitation of surface plasmons. It has a carrier element 12, a spacer 15, and a spring arm 17 with a sensor tip 19. Instead of the reflecting layers of the sensor head 1, plasmon-active layers 14 and 16 are provided on the upper side 13 of the carrier element 12 or the lower side 18 of the spring arm 17, which also extend, as with the specific embodiment shown in FIG. 1, over the spacer 15, so that the thickness of the spacer 15 defines the distance from the spring arm 17 and the carrier element 12. A triangular shaped prism 11 is placed on the lower side of the carrier element 12, so that the light, irradiated from a radiation source 20, undergoes totally reflection at the carrier element 12/plasmon-active layer 14 interface and can be detected by a detector 21. An evanescent field, which excites surface plasmons both in the plasmon-active layer 14 as well as in the plasmon-active layer 16, is produced at the carrier element 12/plasmon-active layer 14 interface. These excitations are shown as two minima in the reflectivity for monochromatic, parallel polarized light as a function of the angle α, as is presented in FIG. 8 (solid curve). This curve was calculated for a thickness of the semitransparent layer of 35 nm and a thickness of the air gap between the mirrors of 700 nm and a wavelength of 670 nm. The figure shows, furthermore, the optical constants of the prism and the gold layers used. A deflection of the arm becomes apparent in the change in the air gap. In order to simulate this case, the reflectivity was also calculated with an air gap 1 nm in size. The difference between the two curves is also shown with a broken line in FIG. 8. The differential curve gives information via the optimal working point (A), which is to be adjusted via the angle. It is 43° in the calculated case. For this angle, the arrangement reacts with a reflectivity change of approximately 1% nm. The measurement takes place by directing parallel polarized light, at this optimal angle, onto the base area of the prism. The polarization is produced by an additional polarizer 23 located in the beam path. There is a detector 21 in the reflected light, whose signal change is a measure of the distance change of the air gap produced by the deflection of the arm.

Figure 6:
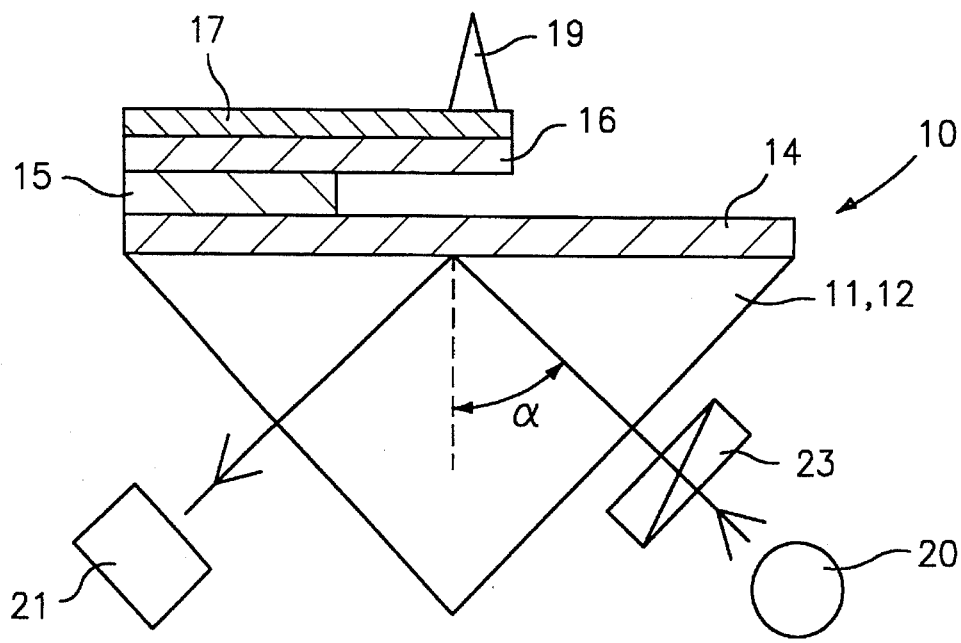

As is shown in FIG. 6, one can omit the carrier element 12 in the specific embodiment shown in FIG. 5, if the carrier element 12 is designed as a prism 11. In this case, the plasmonactive layer 14 is directly applied to a lateral face of the prism 11.

Figure 7:
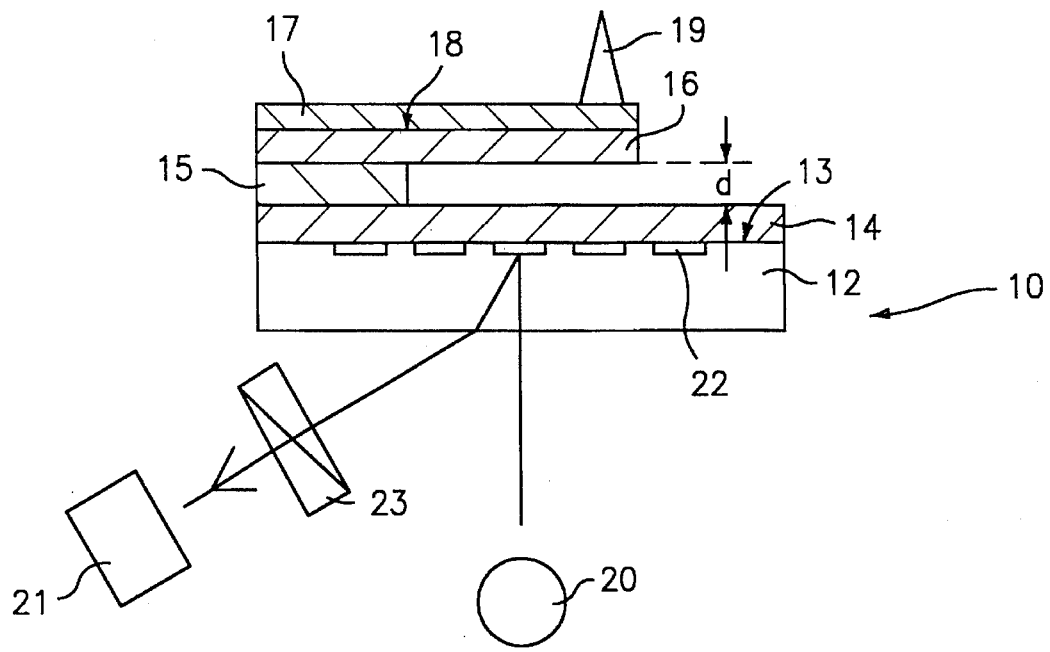

FIG. 7 shows another specific embodiment of the sensor head 10, wherein instead of a prism 11, a diffraction grating 22 is applied to the surface 13 of the carrier element 12. The grating constant is selected in such a manner that the irradiated monochromatic light in a order of diffraction fulfills the coupling condition for surface plasmons and thereby reacts optimally at the same time to a change in the air gap between the mirrors. A polarizer 23 is placed in the reflected light of the pertinent order of diffraction in such a way that only parallel polarized light arrives at the detector 21.

A deflection arm of the is effective via the change in the air gap in a signal change on the detector 21, because in this way, the coupling with the surface plasmon excitation is modified.

We claim:

1. Sensor head, in particular for atomic force microscopy, comprising: a carrier element and a spring arm, wherein the spring arm is attached to the carrier element and extends at a distance over the carrier element, wherein the spring arm is connected to the carrier element via at least one spacer consisting of a layer of defined thickness d, and wherein the thickness d of the spacer layer(s) is an odd multiple of λ/4+φ, wherein λ is the wavelength of electromagnetic radiation directed onto the sensor head and φ is a material-dependent, fixed phase shift.

2. The sensor head of claim 1 wherein the layer of defined thickness d is a sacrificial layer.

3. The sensor head of claim 2 wherein the layer is made of a material selected from the group consisting of nickel, titanium, and titanium oxide.

4. The sensor head of claim 1 wherein the carrier element and the spring arm have opposing surfaces, wherein each of these opposing surfaces carries a reflecting layer and wherein the carrier element is transparent.

5. The sensor head of claim 4, wherein the reflecting layer found on the carrier element is partially transparent.

6. The sensor head of claim 1 further comprising a prism, wherein the carrier element has a first surface opposite the spring arm and a second surface, and wherein the prism is located on the second surface of the carrier element.

7. The sensor head of claim 1 wherein the carrier element is designed as a prism having lateral faces, wherein one of the lateral faces is turned toward the spring arm.

8. The sensor head of claim 1 wherein the carrier element has a first surface opposite the spring arm and a second surface, and wherein the carrier element carries a diffraction grating on the first surface or the second surface.

9. The sensor head of claims 6, 7 or 8 wherein the spring arm has a first surface opposite the carrier element and wherein at least one plasmonactive layer having surface plasmons is provided on the first surface or on the lateral face turned toward the spring arm of the carrier element or is provided on the first surface of the spring arm.

10. The sensor head of claim 9 wherein the distance d between the carrier element and the spring arm is set, so as to excite the surface plasmons in at least one plasmonactive layer.

11. A method for the production of a sensor head, wherein the sensor head comprises: a carrier element; and a spring arm having a first surface opposite the carrier element, wherein at least the spring arm is prefabricated and the spring arm is connected to the carrier element, and wherein the method comprises:

applying a layer system having opposing surfaces to the first surface of the spring arm wherein one layer of the layer system is a sacrificial layer having a thickness d, wherein the thickness d of the sacrificial layer is an odd multiple of $\lambda/4+\phi$, wherein $\lambda$ is the wavelength of electromagnetic radiation directed onto the sensor head and $\phi$ is a material-dependent, fixed phase shift;

connecting the carrier element to an opposing surface of the layer system; and removing by etching a portion of the sacrificial layer below the spring arm leaving at least one spacer.

12. The method of claim 11 wherein the spring arm is produced on a silicon wafer and wherein the method further comprises removing the silicon wafer before removing by etching a portion of the sacrificial layer.

13. A method for the production of a sensor head, wherein the sensor head comprises: a carrier element; and a spring arm having a first surface, and wherein the method comprises:

applying a layer system having opposing surfaces to the carrier element wherein one layer of the layer system is a sacrificial layer having a thickness d, wherein the thickness d of the sacrificial layer is an odd multiple of $\lambda/4+\phi$, wherein $\lambda$ is the wavelength of electromagnetic radiation directed onto the sensor head and $\phi$ is a material-dependent, fixed phase shift;

applying the first surface of the spring arm to an opposing surface of the layer system wherein the spring arm comprises a silicone-containing layer; and removing by etching a portion of the sacrificial layer under the spring arm leaving at least one spacer.

14. The method of claims 11 or 13 wherein the layer system further comprises at least one reflecting and/or plasmonactive layer.

15. The method of claims 11 or 13 wherein the layers of the layer system are vapor-deposited or sputtered.

16. The method of claim 14 wherein the reflecting layer or the plasmonactive layer is applied using a lift-off technique.

17. The method of claim 14 further comprising applying an adhesive layer made of chromium to the carrier element, the sacrificial layer or the first surface of the spring arm and then applying the reflecting layer or the plasmonactive layer.

18. The method of claim 14 further comprising applying a coating corresponding to the reflecting layer or the plasmonactive layer on the first surface of the spring arm.

19. The method of claims 11 or 13 wherein the thickness d of the sacrificial layer is established by monitoring during application of the sacrificial layer.

20. A method for measuring the deflection of a spring arm of a sensor head, wherein the sensor head comprises: a carrier element; and a spring arm, separated by distance d, wherein at least one plasmonactive layer having surface plasmons is provided on the carrier element or on the spring arm defining an interface, wherein the distance d is set so as to excite the surface plasmons in at least one plasmonactive layer, and wherein the method comprises:

directing electromagnetic radiation onto the carrier element at an angle $\alpha$ to the interface opposite the spring arm, so that surface plasmons are excited in at least one plasmonactive layer by an evanescent field formed at the interface; and determining the spring arm/carrier element distance change from the intensity of the radiation reflected at the interface.

\* \* \* \* \*